United States Patent Office 3,391,099
Patented July 2, 1968

3,391,099
POLYMERIZATION PROCESS
John Oliver Punderson, Wilmington, Del., assignor to E. I. du Pont de Nemours and Company, Wilmington, Del., a corporation of Delaware
No Drawing. Filed Apr. 25, 1966, Ser. No. 544,824
10 Claims. (Cl. 260—29.6)

ABSTRACT OF THE DISCLOSURE

Process of aqueous dispersion polymerization of tetrafluoroethylene polymers in which the amount of dispersing agent used is programmed such that there is at least 0.0001 weight percent of dispersing agent present as based on the water present before 2 weight percent as based on the total dispersion of polymer solids are formed, there is from 0.0002 to 0.5 weight percent based on the water present when the polymer solids concentration is in the range of 0 to 4 weight percent as based on the total dispersion, and such that there is dispersing present in excess of 0.05 weight percent as based on the water present when the amount of polymer solids present is in excess of 10 weight percent as based on the total dispersion and recovering an aqueous dispersion containing at least 20 weight percent tetraflurorethylene polymer solids.

---

This invention relates to an improved process for the dispersion polymerization of tetrafluoroethylene hereinafter referred to as TFE.

Polytetrafluoroethylene can generally be divided into two broad but distinct categories often referred to as "granular" and "dispersion" forms of this polymer. The former of these is disclosed in U.S. Patent No. 2,393,967, issued to M. M. Brubaker, and is further defined in U.S. Patent No. 2,936,301, issued to P. E. Thomas and C. C. Wallace, Jr., and is the subject of other subsequent patents, while the second is disclosed in U.S. Patent No. 2,559,750, issued to K. L. Berry, and is also the subject of other subsequent patents. The granular resin is produced in slurry form in an essentially inert polymerization medium, usually water, whereas the "dispersion" form is in essence a stable suspension of particles of colloidal size in a similar medium. The successful production of the dispersion polymer requires the presence of a so-called dispersing agent or soap-like stabilizer, at least during the later stages of polymerization, in order to avoid coagulation.

The "dispersion" resin is uniquely distinguished from the "granular" polymer not only in its state of subdivision, but also in its fabricability. Used directly while still suspended in the polymerization medium, it may be fabricated into useful articles by many of the well-known techniques by which latexes and colloidal suspensions are handled; i.e., by dip-coating, electrodeposition, film casting, and the like.

Recovery of the polymer from the dispersion polymerization medium such as by means of appropriate mechanical or chemical coagulation, followed by removal of most or all the medium by means such as drying yields a product which, when mixed with a suitable lubricating liquid such as Stoddard solvent to form a paste- or dough-like mass, can readily be extruded at ordinary temperatures to form useful articles such as wire-coating, tubing, tape, and the like, as disclosed in U.S. Patent No. 2,685,-707, issued to W. E. Llewellyn and J. F. Lontz. The dried "granular" resin does not adapt itself to fabrication by this technique.

Prior processes for the dispersion polymerization of TFE have generally been based on adding a selected amount of dispersing agent to the polymerization medium prior to initiation of the polymerization reaction, and adding no further quantity of dispersing agent once said reaction had begun. For successful operation of the process, a sufficient concentration of dispersing agent has to be used to prevent substantial coagulation of the polymer during polymerization to the solids level desired. Although this method of operation has the advantages of convenience and simplicity, there are a number of disadvantages. For one thing, the typical, frequently, low-cost, hydrocarbon-based dispersing agents and soaps can not be used successfully, since the reaction takes place only very slowly, if at all, presumably because initiation of polymerization is impeded due to termination of the free radicals by hydrogen atoms abstracted from the dispersing agents. Furthermore, the product of such polymerizations after fabrication and sintering is generally discolored by retained dispersing agent or decomposition products thereof. Therefore, highly fluorinated and even perfluorinated or perhalogenated dispersing agents have been used so as to permit high rates of polymerization to be achieved and to lessen the contamination of the polymer product with hydrocarbon-based residues.

A second disadvantage of the technique of adding the total quantity of dispersing agent prior to the initiation of polymerization is that many dispersants, including the fluorinated type, when employed in the concentrations necessary to provide adequate stabilizing power at economically attractive levels of solids content (generally 20 to 60 percent solids), yield products which gave undesirable performance when extruded according to the lubricated paste process mentioned earlier. Among such undesirable features are the fact that they require high extrusion pressures and generally produce rough, non-uniform extrudates. In some cases, a significant fraction of the dispersion particles consists of rod-shaped particles, rather than the spheroidal particles. Although such rod-shaped particles may well be suited to certain other types of fabrication, they have a deleterious effect on paste extrusion when forming thin sections which require high reduction ratios. In addition, dispersions of rod-shaped particles tend to be less stable than those composed of predominantly spheroidal particles.

U.S. Patent No. 3,009,892 issued to J. E. Duddington and Stanley Sherratt, discloses a process in which addition of dispersing agent is delayed until after a solids content of from 2 to 10 percent has been achieved. Hydrocarbon-based dispersants such as the well-known sodium lauryl sulfate, and others, can be employed in this process to give reasonably stable dispersions while producing only moderate amounts of coagulum. This delayed-addition process results in very low rates of polymerizationa nd low levels of not much over 15 percent of solids content if coagulum formation is to be kept at a reasonably low level. In addition, the delayed addition process does not offer opportunity for advantageous control of particle size as will be discussed hereunder.

An object of the present invention is to provide a process for the dispersion polymerization of tetrafluoroethylene which embodies a precise system for control of average particle size over a wide range. Another object of this invention is to provide a method for polymerization of tetrafluoroethylene to dispersions of very high solids content without excessive coagulum formation. A further object of this invention is to provide a method by which two dispersing agents can be used in combination to achieve desirable particle characteristics together with economy in total cost of dispersing agent.

The term "dispersing agent" as used herein is intended to include materials commonly understood to be "surface-active," which implies the ability to cause a measurable lowering of the surface tension of the medium in which the agent is dissolved or otherwise dispersed. Substances possessing this property can further be classified into ionic and non-ionic types, both of which find utility in the instant invention. Generally, such dispersing agents are characterized by the presence, within a single molecule, of recognizable lyophobic and lyophilic moieties capable of forming a bridge-like association between two otherwise antagonistic substrates, in this case specifically an aqueous medium and finely divided polytetrafluoroethylene, by concentration at the interface between the two phases.

In the past, it has been common to refer to polytetrafluoroethylene dispersions of certain particle size ranges as preferred products. As commercial use of these dispersions has become more widespread, it has become increasingly apparent, however, that there is no one optimum product. To the contrary, varied uses of the dispersions make it highly desirable to be able to produce stable dispersions having varied particle sizes. In some uses, the performance of the dispersion is very markedly dependent on particle size, and the commercial utility of a dispersion product can often be greatly enhanced by a very modest adjustment in particle size. Hence, the ability to control particle size at any of several different levels is highly desirable. Reducing the dispersing agent concentration appreciably below normal operating levels results in increased coagulation, and increasing dispersing agent concentration substantially provides an extremely marginal shift in particle size accompanied by the disadvantage that higher dispersing agent cost is entailed and that there is increased tendency for the formation of rod-shaped particles which are undesired for many applications.

It has now been found that the dispersion polymerization passes through two distinct periods or phases. The initial period of the reaction is a nucleation phase in which a given number of polymerization sites or nuclei are established. Subsequently, there occurs a growth phase in which the predominant action is polymerization of TFE on established particles with little or no formation of new particles. The transition from the nucleation to the growth stage of polymerization occurs smoothly between about the 4 and 10 percent solids levels in the dispersion polymerization of TFE.

Because the period after the formation of about 10 percent solids is characterized by growth of established particles rather than nucleation of new particles, essentially all of the new monomer taken up by the polymerization mixture during the growth period goes to increase the average diameter of the established particles throughout the remainder of the run. The average particle size at any given solids level, as, for example, at 35 percent solid concentration, is therefore uniquely determined by the number of particles which was initially established during the nucleation period. According to the process of the present invention, the number of particles nucleated can be controlled and systematically varied.

The basic feature of this invention comprises the programming of dispersing agent addition in a manner such that the concentration of dispersing agent present at the start of nucleation is a finite, very low value, but definitely not zero, followed by increasing the concentration of dispersing agent subsequent to the nucleation period to a level sufficient to prevent substantial coagulation as higher levels of solids content are achieved.

The process of the invention may variously be termed as split addition, multistage addition, or programmed addition of dispersing agent as contrasted to previous processes such as the conventional initial addition of dispersing agent or the delayed addition process in which no dispersing agent is present during all or most of the nucleation period. The invention consists in carrying out a nucleation process in which the number of particles nucleated is precisely controlled by the presence of a definitely established concentration of dispersing agent, said concentration being substantially lower than that which would be needed to stablize the dispersion against subsequent coagulation at high solids concentrations, and in following the nucleation period with a growth period carried out at higher dispersing agent concentrations.

One of the surprising features of the present invention is the discovery that an unexpectedly small amount of dispersing agent is needed during the nucleation period of the polymerization to bring the nucleation under control of the dispersing agent. In a run typical of prior art practice, in which 0.15 percent of APFC dispersing agent is initially charged to the reactor and no further addition of dispersing agent is made during the polymerization, the average particle size obtained at the 35 percent solids level is 0.227 micron, and the practical limits preventing significant variation of this particle size by varying dispersing agent concentration have been discussed above. (In this specification APFC stands for ammonium perfluorocaprylate, also known as ammonium perfluorooctanoate; AFC stands for ammonium ω-hydrohexadecafluorononanoate, and AHT stands for ammonium 3,6-dioxa - 2,5-di-(trifluoromethyl)-undecafluorononanoate). The space-time yield (STY) in such a run is about 355 grams/liter-hour. Likewise, by the prior art procedure of delaying addition of dispersing agent until after about 9 percent solids have been formed, adding 0.15 percent of APFC and continuing the polymerization to 35 percent solids, an average particle size of greater than 0.4 micron is obtained, and reproducibility of this high value in repeated runs under nominally the same conditions is poor. The STY is below 200 grams/liter-hour.

By operating the process of the present invention with a dispersing agent concentration of only 0.015 percent of APFC during the nucleation period and adding additional dispersing agent to make a total of 0.15 percent of APFC after about 9 percent of solids has been formed, an average particle size of 0.236 micron is obtained at the 35 percent solids level (STY=330). This very modest increase in particle size compared with the 0.227 micron particle size obtained when 0.15 percent dispersing agent was present during nucleation indicates that the nucleation process is still under control of the dispersing agent, even though its concentration is only one-tenth of the value normally used.

Repeating the above split-addition polymerization but reducing the amount of APFC to 0.006 percent during the nucleation period and adding additional APFC to make a total of 0.15 percent after about 9 percent solids has been formed gives a product with an average particle size of 0.277 micron after 35 percent solids has been achieved (STY=265). The sharp increase in particle size resulting from the small shift in dispersing agent concentration from 0.015 percent to 0.006 percent during nucleation indicates that a sharp zone of transition is being entered between the dispersing-agent controlled nucleation of the present process and the uncontrolled nucleation of the delayed addition process. The particle size obtained using 0.006 percent APFC during nucleation is closer, however, to that obtained using 0.015 percent APFC during nucleation than to that obtained when no dispersing agent is used, indicating that the nucleation is still largely under control of the dispersing agent. Thus, with APFC dispersing agent in this particular reaction system, a modest control of particle size is available by shifting dispersing agent concentration during nucleation down through the range from 0.15 percent to 0.015 per cent, and further control is available in the range from 0.015 percent to about 0.006 percent.

Because of the low concentration of dispersing agent required during the nucleation period, it has been found possible to employ very low concentrations of substantially hydrocarbon-based dispersing agents containing a plurality of hydrogen atoms per molecule and relatively few or no fluorine or other halogen atoms per molecule for this first stage of the polymerization, as hereinbelow illustrted in Examples XII and XV.

Another surprising feature of the present invention is the discovery that with some dispersing agents, it is possible to shift particle size downward from its normal value, instead of upward, by controlled nucleation at low levels of dispersing agent. For instance, when using conventional polymerization with 0.15 percent of AHT dispersing agent added initially gives a 0.285 micron particle size at 35 percent solids (STY=380), whereas the delayed addition process using AHT gives a particle size in excess of 0.4 micron (STY below 200). By use of the split addition procedure of the present invention, using a 0.015 percent dispersing agent concentration during nucleation and a total of 0.15 percent after 6 percent of solids is formed, particle size of 0.238 micron at the 35 percent solids level (STY=305) is obtained. Using 0.006 percent of AHT during nucleation gives a further reduction to 0.203 micron particle size (STY=335). Thus, it is possible in this system to reduce particle size in a smooth and controlled manner over a wide range by practice of the teachings herein.

In addition to the control that is available by varying the amount of dispersing agent initially added, further control of particle size can be exercised by varying the time at which further addition is made. This effect is illustrated in Table I in which 0.015 percent of AHT is added initially and 0.0135 percent of AHT was added subsequently at various times in a number of runs; the particle diameters obtained at 35 percent solids are as reported in Table I.

TABLE I

| Percent Solids at time of second addition | Particle Diameter in microns at 35% Solids Level by Light Transmission Measurements | Space-Time Yield, grams/Liter-Hour |
| --- | --- | --- |
| 0 | 0.285 | 380 |
| 4 | 0.260 | 354 |
| 7 | 0.252 | 314 |
| 13 | 0.244 | 303 |
| 18 | 0.243 | 345 |
| 22.5 | *0.243 | |

*Approximately 1.2 percent coagulum, dry basis.

It can be seen that continuous control over the range of 0.285 to 0.243 micron at the 35 percent solids level can be readily obtained by this technique.

This multiple stage addition of dispersing agent need not be limited to the use of only one dispersing agent or even to a given type of dispersing agent. The nucleation may advantageously be carried out in the presence of a very small concentration of one agent, and the desired stabilization effected by addition of another agent. This technique may be used to reduce costs by using a relatively inexpensive second agent such as 1,4,5,6,7,7-hexachlorobicyclo(2.2.1)-5-heptene-2,3-dicarboxylic acid, commonly known as chlorendic acid, or salts thereof.

In the practice of this invention, the first addition of dispersing agent should be made initially, i.e., prior to any polymerization, or at least prior to the formation of 2 percent of polymer solids in the dispersion. For some dispersing agents such as the condensation product of one part octyl phenol and from 9 to 10 parts of ethylene oxide, the condensation products of straight chain secondary alcohols and ethylene oxide which, if desired, can be further modified through terminal hydroxy groups to minimize foaming tendency, organophosphates, the condensation product of one part nonyl phenol and about 7 parts of ethylene oxide; control of nucleation can be attained with as little as 0.0001 percent of the dispersing agent, but for most of the commonly used halogenated dispersing agents, it is preferred that concentrations in the range of 0.003 to 0.05 weight percent of dispersing agent be used based on the amount of aqueous polymerization medium present exclusive of polymer. More than one dispersing agent may be present during the nucleation period provided that the total of such dispersing agents is consistent with the teachings of this specification.

The second-stage addition takes place chiefly during the growth period, i.e., after formation of 4 to 10 percent solids, and preferably is such that the total dispersing agent concentration is brought into the range of from 0.05 percent to 2.0 percent before 15 percent polymer solids is formed. Obviously, the optimum levels used will depend somewhat upon specific characteristics of the dispersing agent used and the particle size it is desired to obtain.

If desired, the addition sequence for the dispersing agent can be modified from simple stepwise addition to continuous addition or other programmed addition of dispersing agent provided that the average dispersing agent levels during the various periods of the polymerization are in conformity with the teachings set forth above.

The reaction conditions used in carrying out the polymerization are otherwise similar to those generally used. Suitable dispersing agents for the practice of this invention are those commonly used in fluorocarbon polymerization such as those described in U.S. Pats. Nos. 2,559,629, 2,559,752, 2,816,082 and in U.S. application Ser. Nos. 129,526, filed Aug. 7, 1961 by William Emmett Garrison, Jr., and 300,076, filed Aug. 5, 1963 by R.E. Putnam and W. D. Nicoll. Dispersing agents containing fluoroalkyl groups of at least 6 carbon atoms are commonly used, wherein the term fluoroalkyl is understood to include both the completely fluorinated alkyl groups and partially fluorinated alkyl groups containing one or more of hydrogen or chlorine atoms in addition to fluorine.

An especially preferred class of these fluoroalkyl dispensing agents, as disclosed in U.S. Patent No. 2,559,752, have the structure $B(CF_2)_nCOOY$, wherein B is selected from the class consisting of hydrogen and fluorine; Y is selected from the class consisting of hydrogen, the ammonium radical, lower alkyl amine radicals, and tetra (lower alkyl ammonium) radicals, and $n$ is an integer of from 6 to 20 and preferably from 6 to 12. Suitably hydrocarbon-based dispersing agents which can be used under the conditions described herein include both ionic types such as sodium lauryl sulfate and nonionic types such as "Triton" X-100

The basic requirements of substances fulfilling these functions is that they have the ability to provide a surface-active effect; that is to lower the surface tension of the aqueous medium. Though there appears to be no singular correlation between surface activity and either nucleating or stabilizing power which is universally applicable, it has been found that both such powers are enhanced for substances having more than a minimum of surface activity. It is, thus, desirable that, at the concentration of 1 percent in the aqueous medium (or in a saturated solution if the solubility of the substance is less than 1 percent), the subsance should have the ability to reduce surface tension by at least 20 dynes/centimeter as measured at room temperature. For the nucleation function where very low concentrations of the nucleator are generally desired, the substance should, at the concentration of 0.01 percent in the aqueous medium, have the ability to reduce surface tension by at least 30 dynes/centimeter as measured at room temperature.

While this invention has been described mainly with reference to polytetrafluoroethylene homopolymer, the principles apply to TFE copolymers. Substances commonly copolymerized with TFE include ethylenes, various substituted and particularly halogenated ethylene, propylene and halogenated propylenes, and halogenated vinyl ethers. The TFE polymers of this invention, however, preferably contain 75 percent or more of TFE. The principles of the invention are broadly applicable to modified polymerization and copolymerization procedures as disclosed in U.S. Patents Nos. 3,142,665 and 3,132,124.

In order to obtain a suitable rate of polymerization, a pressure of 30–1,000 p.s.i and a temperature of 30 to 150° C., and preferably a pressure of 100 to 800 p.s.i. and a temperature of 60 to 120° C. should be maintained. This means that the reactor is an autoclave or equivalent high pressure vessel.

The average particle diameters referred to herein are those determined, by a relationship based on light-scattering theory, from the percentage of incident light transmitted at 546 millimicron wavelength through a unit measure of a dilute dispersion (ca. 0.02 weight percent solids), using a nominal value of 0.018 cc./gram for the refractive index increment, $\Delta n/\Delta c$, of said dispersion at 25° C. These values are in theory nearly equal to the weight-average particle diameter, as confirmed by ultracentrifuge analysis, and are further in reasonable agreement with those determined directly by examination of electron micrographs of the particles at 20,000 diameters magnification. For resins modified with about 0.15 weight percent of combined hexafluoropropylene, a refractive index increment of 0.016 cc./gram is used. Preferably, the particle size obtained is from 0.15 to 0.5 micron.

From the description given above, it may be seen that very low concentrations of dispersing agent are sufficient to provide a measurable nucleating effect. To provide a true measure of such effect, it is necessary that the polymerization vessel be scrupulously clean and free of dispersing agent at the start of each test. This condition was accomplished in all of the following examples by careful rinsing and steaming procedures.

The following examples are illustrative of the invention.

Example I

A horizontally-disposed, water-steam jacketed, cylindrical, stainless steel 6200 ml. autoclave, having a cage-type agitator running the length of the autoclave, and having a water capacity of 6200 grams is charged with 200 grams of paraffin wax (M.P. 58° C.), 0.0065 gram of electrolytically reduced iron powder, and 0.20 grams of ammonium 3,6 - dioxa-2,5-di-(trifluoromethyl) - undecafluorononanoate (AHT). The autoclave is then evacuated and 2450 grams of distilled and deoxygenated water is drawn in. The autoclave is heated to 70° C., at which time the vapor space is again evacuated and then filled with purified TFE at a pressure of 25 pounds per square inch gauge (p.s.i.g.). Then a solution of 1.623 grams of disuccinic acid peroxide in 750 grams of distilled and deoxygenated water is added and the system is agitated and further heated to 85° C. The pressure of tetrafluoroethylene is then increased to 400 p.s.i.g., and the supply of TFE is then shut off. As soon as a 10 p.s.i. drop in pressure is noted (with temperature remaining constant) indicating a commencing of reaction (commonly termed as "kick-off"), the pressure is restored to 400 p.s.i.g. by addition of TFE and automatically maintained at this value as reaction proceeded at 85° C. A continuous record is kept of the amount of TFE fed to the autoclave. When 255 grams of TFE has been reacted, an additional 4.7 grams of AHT as a 10 percent aqueous solution is pumped into the autoclave. The valve in the line through which TFE is automatically admitted to the autoclave is left open until a precalculated amount of TFE has been fed, at which time the valve is closed. This precalculation is arranged such that the total amount of TFE fed to the autoclave is sufficient, after the pressure in the autoclave has, by continued reaction at 85° C., decreased to 175 p.s.i.g. and the remaining TFE vented off, to provide a nominal solids contents of 35 percent in the dispersion of polymer and water forming the liquid phase in the autoclave. The solids content as determined by hydrometer measurement in this experiment is 34.7 percent. Essentially no coagulum is formed during the polymerization. The rate of polymerization (space-time yields) is 335 grams per liter-hour, based on the measured time elapsed between "kick-off" and the time at which the pressure in the autoclave reached 175 p.s.i.g. The average particle size as measured by light-transmission measurement is 0.232 micron, while the particle size corresponding to the maximum of the weight distribution of size as measured in analytical ultracentrifuge is 0.221 micron.

A portion of the dispersion product, after cooling and removal of the supernatant solid wax, is diluted, treated with dilute aqueous ammonium hydroxide to a pH level of 9, and coagulated by the procedure of U.S. Patent 2,593,583, issued Apr. 22, 1952 to J. F. Lontz. The resin possessed a specific gravity of 2.209 when measured according to the standardized procedure given in A.S.T.M. D–1457–56T.

Example II

A control run is made similar to the run of Example I except that all of the dispersing agent is added initially; i.e., 4.9 grams of ammonium 3,6-dioxa-2,5-di-(trifluoromethyl)undecafluorononanoate is charged initially to the same autoclave, and no further quantity is added thereafter. Otherwise the same procedures, conditions, and quantities of other ingredients as those employed in Example I are used, the total quantity of water present being 3250 grams. The polymerization is carried out to 35.0 percent solids. The rate of polymerization is 347 grams per liter-hour, and the particle size as measured by light transmission is 0.285 micron. Ultracentrifuge measurements indicate a diameter corresponding to the peak of the weight distribution curve of 0.278 micron. The resin possessed a specific gravity of 2.216 as determined by A.S.T.M. D–1457–56T.

Comparison of the results of the two examples above shows that the split addition procedure of Example I allows the particle size to be shifted downward while a relatively rapid polymerization rate and ability to polymerize to high solids concentration are maintained.

Example III

The experiment described in Example I is repeated with the exception that in the second addition of dispersing agent, made in this case after 350 grams of TFE has reacted, the agent added is 30 grams of chlorendic acid as contained in a 30 percent by weight stirred aqueous mixture held at 100° C. until injected into the reactor. The polymerization is continued to a solids content of 34.6 percent. The rate of polymerization is 342 grams/liter-hour. Essentially no coagulum is formed during the polymerization and the average particle diameter as measured by light transmission is 0.253 micron. Ultracentrifuge measurements indicate a most probable particle diameter of 0.227 micron. The resin possessed a specific gravity of 2.203 as determined by A.S.T.M. D–1457–56T. The sintered chip on which the specific gravity measurement is made appeared to be white and free of contamination.

Similar results are obtained in runs in which either 1.0 gram of APFC or 1.0 gram of AFC is substituted for 0.2 gram of AHT as nucleating agent and chlorendic acid is subsequently added in the manner described above.

Example IV

The procedure of Example I is repeated, except that 0.20 gram of ammonium perfluorooctanoate is substituted in place of the 0.20 gram of AHT originally charged to the autoclave. When 350 grams of TFE has reacted, 4.7 grams of ammonium perfluorooctanoate (instead of 4.7 grams of AHT) as contained in a 10 percent aqueous solution is introduced into the autoclave, and the polymerization is continued to a solids content of 34.8 percent. Essentially no coagulum is formed during the polymerization, and the average particle size of the product as measured by light transmission is 0.277 micron. The resin has a specific gravity of 2.204 as determined by A.S.T.M. D–1457–56T. The rate of polymerization is 265 grams/liter-hour.

Example V

The procedure of Example I is followed except that 0.81 gram of ammonium perfluorooctanoate is substituted in place of the 0.20 gram of AHT originally charged to the autoclave and that just prior to the initial pressure of the autoclave to 400 p.s.i.g. with TFE, 10.5 grams of hexafluoropropylene (HFP) is injected into the autoclave. The quantity of chlorendic acid subsequently injected after 6 percent solids has formed is 20 percent higher than that in Example III. The polymerization is carried to a solids content of 35.3 percent. The space-time yield is 270 grams/liter-hour. Essentially no coagulum forms during the polymerization and the average particle size as measured by light transmission is 0.224 micron. The combined HFP content of the dried polymeric product is found by calibrated infrared analysis to be 0.15 weight percent. The resin possesses a specific gravity of 2.190 as determined by A.S.T.M. D–1457–56T.

Example VI

Using an autoclave similar to that of Example I but of somewhat larger size, a run similar to that of Example V is carried out. As nucleating agent, 0.026 percent of AFC is incorporated in the aqueous charge. After reaction has proceeded to the extent of forming 5 percent solids, an aqueous solution of sodium lauryl sulfate is injected into the autoclave to give a concentration of 0.13 percent based on the amount of water present. The reaction rate decreases progressively as the run proceeds, and the pressure is allowed to decrease (through reaction) only to 300, rather than 175, p.s.i.g. after the supply of TFE monomer has been shut off. The final solids content is 34.6 percent. The space-time yield is less than 160 grams/liter-hour. A negligible amount of coagulum is formed. The average particle size is 0.244 micron, and the combined HFP content of the polymeric product is 0.12 weight percent. The specific gravity is 2.180 according to A.S.T.M. D–1457–56T. However, the polymer after this air sintering treatment is dark grey in color, with brown mottling present, indicating strong retention of the sodium lauryl sulfate on the polymer. Prolonged leaching of the unsintered resin (either before or after drying) in either acetone or methanol in a Soxhlet extractor provides some lightening in color after sintering, but the product is still far from white. There is, however, no indication that the excellent properties (mechanical, electrical, and chemical) of the polymer are impaired by the indicated retention of dispersing agent, nor the fabricability of the polymer affected.

In a control run made with 0.13 percent of AFC present throughout the run as sole dispersing agent, the final solids content (after allowing the pressure to decrease to 175 p.s.i.g.) is 35.0 percent. The space-time yield is 355 grams/liter-hour. A negligible amount of coagulum is formed. The average particle size is 0.213 micron, and the combined HFP content of the polymeric product is 0.125 percent. The specific gravity is 2.208, but in this case the sintered polymer is white in color.

In a run similar to that described above with sodium lauryl sulfate but with 0.13 percent of sodium lauryl sulfate added directly to the aqueous charge, and no other dispersing or nucleating agent present, no detectable reaction occurs within one hour after the TFE is introduced at a pressure of 400 p.s.i.g.

In another run identical to that described above with delayed addition of sodium lauryl sulfate, but with nucleating agent omitted, heavy coagulation ensues at a point well before a dispersion of 35 percent solids content could be achieved. The slow rate of polymerization drops virtually to zero after coagulation occurs.

Example VII

The reactor of Example I is charged with 126 grams of a paraffin wax (M.P. 58° C.) and 0.90 gram of APFC. The autoclave is then evacuated and 3430 grams of distilled and deoxygenated water containing 10 grams of an aqueous solution containing 1.08 percent by weight of C.P. methanol was drawn in. The autoclave is then heated to 70° C., at which time the vapor space is again evacuated and then filled with purified TFE at a pressure of 30 pounds per square inch gauge (p.s.i.g.). Then 12.0 grams of purified hexafluoropropylene is injected, the agitator was set in motion, and 150 grams of an aqueous solution containing 0.144 percent by weight of C.P. ammonium persulfate is injected. The pressure of TFE is then increased to 400 p.s.i.g., and the supply of TFE then shut off. As soon as a 10 p.s.i. drop in pressure was noted (with temperature remaining constant at 70° C.), indicating "kick-off," the pressure is restored to 400 p.s.i.g. by addition of TFE and automatically maintained at this value as reaction proceeded at 70° C. A continuous record is kept of the amount of TFE fed to the autoclave. When about 250 grams of TFE has reacted, 95 grams of a well-stirred aqueous mixture maintained at 100° C. and containing 48.5 percent by weight of chlorendic acid is injected into the autoclave. The rate of consumption of TFE is observed to drop off somewhat in this case when the chloroendic acid is injected, so 75 grams of an aqueous solution of ammonium persulfate of the same concentration as that used earlier is injected, and the rate of consumption of TFE is thereby restored to the former level. The usual procedure of allowing the pressure to decrease through continued reaction at 70° C. to 175 p.s.i.g. after the supply of monomer has been shut off (in this case at a level calculated to provide 40 percent solids in the dispersed product) was followed. The remaining TFE and hexafluoropropylene are then vented off. The solids content of the product, by hydrometer measurement at 25° C. after the product has been cooled and the solid, supernatant wax layer has been removed, is 39.1 percent. A negligible quantity of coagulum has formed in the autoclave. The rate of polymerization was 170 grams per liter-hour. The average particle size is 0.218 micron. The specific gravity of the dried polymeric product after coagulation by the usual procedure is 2.198 according to procedure A.S.T.M. D–1457–56T. The combined hexafluoropropylene content of the product is 0.15 percent by weight.

Examples VIII–XV

A procedure similar to that of Example I is carried out using the same autoclave as that employed in Example VI. The amounts of ingredients used are chosen such as to obtain concentrations similar to those previously described. The results, shown in Table II, show that very low concentrations (in the 1–10 p.p.m. range) of common, inexpensive surfactants containing a plurality of hydrogen atoms per molecule and relatively few or no fluorine or other halogen atoms per molecule, can be used effectively as nucleating agents for the dispersion polymerization of TFE. Furthermore, these same substances, at the same concentration range, can be used in conjunction with a typical fluorocarbon nucleating agent. Comparison of particle size data of Example XV, and that of Example XIV with that of Example XI, shows that the nonhalogenated agent contributed strongly to the nucleation. Teachings of the prior art, as for examples in U.S. Patent No. 3,009,892, lead to the expectation that the presence of conventional nonhalogenated dispersing agents during the initial stages of the polymerization should lead to inhibition of the polymerization with concomitant low rates and low molecular weights. It is shown in Examples XII and XIII that by reducing the concentrations of conventional agents as taught herein the polymerization can be operated with no decrease in molecular weight (as indicated by standard specific gravity) and very little sacrificie in rate, although the agents are still capable of exerting a profound effect on the nucleation.

In each of Examples IX to XV, the stabilizer is injected into the autoclave at a uniform rate over 11 to 16 minute intervals. In Example IX, the amount of TFE monomer fed into the autoclave is sufficient to have given a final solids content of 36.5 percent in the dispersion product had no coagulum formed. The space-time yield reported for Example IX is calculated on the basis of total polytetrafluoroethylene formed; based on polytetrafluoroethyelene in dispersed form, it is 205 g./liter-hour. In Example XII, "Triton" X-100 is a nonionic octylphenoxyethanol surfactant of the formula

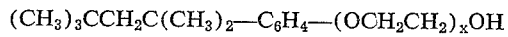

$$(CH_3)_3CCH_2C(CH_3)_2-C_6H_4-(OCH_2CH_2)_xOH$$

wherein $x$ has an average value of between 9 and 10 formed by condensing octyl phenol and ethylene oxide. In Examples XIII to XV, "Surfactant DN-65" is a nonionic surfactant consisting of a straight-chain secondary alcohol condensed with ethylene oxide.

in order to avoid undesirable effects of delaying addition until 2 or more percent of solids are formed.

Example XVII

Into the autoclave of Example I is charged 3714 parts of water, 2.842 parts of disuccinic acid peroxide, 0.0075 part iron powder, and 200 parts of paraffin wax. The autoclave is heated to 70° C., evacuated and purged three times with purified TFE, and then heated to 90° C. At 90° C., the autoclave is pressured to 400 p.s.i.g. with TFE, and the supply of TFE is temporarily shut off. When "kick-off" begins, as indicated by a 10 p.s.i. drop in pressure observed 1 to 2 minutes after full pressure is attained, the pressure is restored to 400 p.s.i.g. and automatically held at this level by continuous addition of

TABLE II

| Ex. No. | Nucleating Agent(s) Type | Conc., Percent | Stabilizing Agent Type | Conc., Percent | Solids Present at Start of Addition of Stabilizer (Percent) | Final Percent Dispersed Solids | Space-Time Yield, gm./liter-hr. | Coagulum Produced Dry Basis (Percent) | Average Particle Size, Microns | Std. Specific Gravity | Color of Dried Polymer Product After Sintering in Air at 380° C. |
|---|---|---|---|---|---|---|---|---|---|---|---|
| VIII | APFC | 0.138 | Same | (0.138) | (0) | 36.4 | 625 | Nil | 0.239 | 2.195 | White. |
| IX | None | 0 | APFC | 0.138 | 7 | 26.0 | 335 | High | 0.351 | 2.210 | Do. |
| X | APFC | 0.0050 | APFC | 0.133 | 7 | 35.2 | 410 | Small | 0.335 | 2.198 | Do. |
| XI | APFC | 0.010 | APFC | 0.128 | 7 | 35.6 | 360 | ...do... | 0.313 | 2.207 | Do. |
| XII | "Triton" X-100 | 0.0004 | APFC | 0.138 | 7 | 35.1 | 320 | Very small | 0.271 | 2.185 | Do. |
| XIII | "Surfactant DN-65" | 0.0004 | APFC | 0.138 | 7 | 37.0 | 335 | Ca. 4 | 0.289 | 2.182 | Do. |
| | "Surfactant DN-65" | 0.0020 | (APFC) | (0.138) | (7) | (¹) | | | | | |
| XIV | "Surfactant DN-65" Plus APFC | 0.0004 +0.0050 | APFC | 0.133 | 7 | 33.6 | 345 | Nil | 0.262 | 2.193 | Do. |
| XV | "Surfactant DN-65" Plus APFC | 0.0004 +0.010 | APFC | 0.128 | 7 | 35.5 | 420 | Nil | 0.245 | 2.192 | Do. |

¹ No reaction.

Example XVI

The autoclave of Example I is charged in this case with 200 parts of paraffin wax, 0.0065 part of iron powder, 2170 parts of distilled, deoxygenated water, and 5 parts of an aqueous solution containing 10 weight percent of AHT. Subsequent procedure up to and including kick-off is the same as in Example I. Additional AHT solution (10 weight percent) is added during the polymerization as follows: 44 parts after 260 parts of TFE has reacted, and additional portions of 93 parts each after 1020 parts, 1530 parts, and 2040 parts of TFE have reacted. The total amount of AHT charged is then 328 parts of solution or 32.8 parts of AHT. The total AHT concentration is then 1.0 percent of the total aqueous charge. The polymerization is carried out until the dispersion reaches a solids content of 60 percent after the pressure has decreased to 175 p.s.i.g. in the manner of Example I. In spite of this extremely high solids production, less than 4 percent of the polymer is in the form of coagulum (dry basis). The average particle size of the dispersion as measured by light transmission is 0.364 micron. The resin has a specific gravity of 2.207 as determined by A.S.T.M. D-1457-56T. The rate of polymerization is 317 grams/liter-hour. Examination of the resin by electron microscopy shows that the material consists of spheroidal particles. The particle size corresponding to the maximum of the weight distribution of size as measured in an analytical ultracentrifuge is 0.310 micron.

Stable dispersions with spherically shaped particles having average diameters in excess of 0.35 micron as attained in Example XVI are very advantageous for some end-use applications of the dispersions. Attainment of dispersions having unusually high solids content by direct polymerziation is likewise advantageous from the standpoint of process economics. The above combination of large, spheroidal particles, low coagulum level, and high solids content cannot be attained by procedures of the prior art.

Example XVII illustrates that the dispersing agent may be programmed as a continuous addition provided that the addition is started initially or at least prior to the formation of about 2 percent of polymer solids in the dispersion TFE, and dispersing agent solution containing 10 weight percent of APFC is pumped to the reaction mixture at a rate of 0.00315 weight percent per minute of APFC dispersion agent, based on the amount of water in the autoclave, up to a total of 0.2 weight percent of the dispersing agent based on the total water in the autoclave. The reaction is continued to 35.9 percent solids based on the total water plus polymer in the autoclave, at which time the average particle size of the dispersion is 0.42 micron, as measured by light transmission. The space-time yield is 449 grams per liter hour, and the specific gravity (A.S.T.M. D-1457-56T) is 2.220.

The polytetrafluoroethylene dispersions of this invention are useful for molding various shapes and for coating cooking ware and coating wires.

The polymeric products of the present invention can be extruded as coherent beadings at extrusion pressures below 5,000 p.s.i.g. when subjected to the test described in U.S. Patent No. 2,931,106, issued to D. R. Campbell.

I claim:

1. A process of producing aqueous dispersion tetrafluoroethylene polymers, including the steps of programming the addition of at least one dispersing agent, said program being such that at least 0.0001 weight percent, as based on the water present of dispersing agent which at the concentration of 0.01 percent in aqueous medium has the ability to reduce surface tension by at least 30 dynes per centimeter as measured at room temperature, is present before 2 percent by weight, as based on the total dispersion, of polymer solids are formed and such that the average concentration of dispersing agent which at the concentration of 0.01 percent in aqueous medium has the ability to reduce surface tension by at least 30 dynes per centimeter as measured at room temperature, is in the range of 0.0002 to 0.05 weight percent based on the water present, when averaged over the period in which the polymer solids concentration is in the range of 0 to 4 weight percent as based on the total dispersion, continuing said programmed addition of dispersing agent such that the average concentration of dispersing agent which at the concentration of 1 percent in aqueous medium has the ability to reduce surface tension by at least 20 dynes per centimeter as measured at room temperature, is in excess of 0.05 weight percent as based on the water present during the period in which the polymer solids concentration is in excess of 10 weight percent as based on the total dispersion, and recovering an aqueous dispersion containing at least 20 weight percent tetrafluoroethylene polymer solids.

2. A process of producing aqueous dispersion tetrafluoroethylene polymers including the steps of programming the addition of at least one dispersing agent, said program being such that at least 0.001 weight percent, as based on the water present, of a dispersing agent, having an ionic hydrophilic portion and a hydrophobic portion selected from the class consisting of fluoroalkyl groups containing at least 6 carbon atoms and perfluoroether groups of the structure $$F-(CF_2)_m-O-[CF(X)-CF_2-O]_n-CF(X)-$$

wherein X is selected from the class consisting of F and $CF_3$, wherein $m$ is an integer of from 1 to 5 and $n$ is an integer of from 0 to 10, is present before 2 percent by weight, as based on the total dispersion, of polymer solids are formed and such that the average concentration of said dispersing agent is in the range of 0.001 to 0.05 weight percent, as based on the water present, when averaged over the period in which the polymer solids concentration is in the range of 0 to 4 weight percent as based on the total dispersion, continuing said programmed addition of dispersing agent such that the average concentration of dispersing agent from the class defined above and chlorendic acid is in excess of 0.05 weight percent, as based on the water present, during the period in which the polymer solids concentration is in excess of 10 weight percent, as based on the total dispersion, and recovering an aqueous dispersion containing at least 20 weight percent tetrafluoroethylene polymer solids.

3. A process of producing aqueous dispersion tetrafluoroethylene polymers including the steps of programming the addition of at least one dispersing agent, said program being such that at least 0.0001 weight percent, as based on the water present, of a dispersing agent having an ionic hydrophilic and a substantially hydrocarbon hydrophobic portion is present before 2 percent by weight as based on the total dispersion of polymer solids has formed and such that the average concentration of said dispersing agent is in the range of from 0.0001 to 0.05 weight percent, as based on the water present, when averaged over the period in which the polymer solids concentration is in the range of 0 to 4 weight percent as based on the total dispersion, continuing a programmed addition of a dispersing agent selected from the class consisting of chlorendic acid and dispersing agents having an ionic hydrophilic portion and a hydrophobic portion selected from the class consisting of fluoroalkyl groups containing at least 6 carbon atoms and perfluoroether groups of the structure $$F-(CF_2)_m-O-[CF(X)-CF_2-O]_n-CF(X)-$$

wherein X is selected from the class consisting of F and $CF_3$, wherein $m$ is an integer of from 1 to 5 and $n$ is an integer of from 0 to 10, such that the average concentration of dispersing agent is in excess of 0.05 weight percent, as based on the water present, during the period in which the polymer solids concentration is in excess of 10 weight percent, as based on the total dispersion, and recovering an aqueous dispersion containing at least 20 weight percent tetrafluoroethylene polymer solids.

4. The process of claim 2 wherein the dispersing agent is ammonium 3,6-dioxa-2,5-di(trifluoromethyl)-undecafluorononanoate.

5. The process of claim 2 wherein the dispersing agent is ammonium perfluorooctanoate.

6. The process of claim 2 wherein the dispersing agent is ammonium omega-hydrohexadecafluorononanoate.

7. The process of claim 2 wherein the first dispersing agent is ammonium 3,6-dioxa-2,5-di(trifluoromethyl)-undecafluorononanoate, and the second dispersing agent added is chlorendic acid.

8. The process of claim 2 wherein the first dispersing agent is ammonium perfluorooctanoate and the second dispersing agent added is chlorendic acid.

9. The process of claim 2 wherein the first dispersing agent is ammonium omega-hydrohexadecafluorononanoate, and the second dispersing agent added is chlorendic acid.

10. The process of claim 2 wherein the dispersing agent has the formula $$B(CF_2)_nCOOY$$

wherein B is selected from the class consisting of hydrogen and fluorine, Y is selected from the class consisting of hydrogen, the ammonium radical, lower alkyl amine radicals, and tetra (lower alkyl ammonium) radicals and $n$ is an integer of from 6 to 20.

References Cited

UNITED STATES PATENTS

| | | |
|---|---|---|
| 2,559,752 | 7/1951 | Berry. |
| 2,816,082 | 12/1957 | Brinker. |
| 2,956,973 | 10/1960 | Holdsworth. |
| 3,271,341 | 9/1966 | Garrison. |

MURRAY TILLMAN, *Primary Examiner.*

J. L. WHITE, *Assistant Examiner.*

UNITED STATES PATENT OFFICE
CERTIFICATE OF CORRECTION

Patent No. 3,391,099          Dated July 2, 1968

Inventor(s) JOHN OLIVER PUNDERSON

It is certified that error appears in the above-identified patent and that said Letters Patent are hereby corrected as shown below:

Column 2, line 53, "polymerizationa nd" should read
-- polymerization and --.

Column 5, line 28, "0.0135 should read -- 0.135 --.

Column 6, line 41, "suitably" should read -- suitable --; line 45, a period (.) should be inserted at the end of the sentence; line 57, "subsance" should read -- substance --.

Column 7, line 73, "yields" should read -- yield --.

Column 9, line 33, insert a period (.) after "percent"; line 34, insert a period (.) after "hour".

Column 13, line 41 (Claim 3), after "hydrophilic" insert -- portion --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents